March 31, 1925.

Re. 16,036

J. A. WHERRY

COLLATING DEVICE FOR TYPEWRITERS AND ADDING MACHINES

Original Filed July 3, 1919 3 Sheets-Sheet 1

Inventor
John A Wherry
by D. C. Stickney
Attorney

March 31, 1925.

Re. 16,036

J. A. WHERRY

COLLATING DEVICE FOR TYPEWRITERS AND ADDING MACHINES

Original Filed July 3, 1919 3 Sheets-Sheet 2

Inventor
John A. Wherry
by B. C. Stickney
Attorney

March 31, 1925. Re. 16,036

J. A. WHERRY

COLLATING DEVICE FOR TYPEWRITERS AND ADDING MACHINES

Original Filed July 3, 1919 3 Sheets-Sheet 3

Inventor
John A. Wherry
by B. B. Whitney
Attorney

Reissued Mar. 31, 1925. Re. 16,036

UNITED STATES PATENT OFFICE.

JOHN A. WHERRY, OF NEW ORLEANS, LOUISIANA, ASSIGNOR TO UNDERWOOD TYPEWRITER COMPANY, OF NEW YORK, N. Y., A CORPORATION OF DELAWARE.

COLLATING DEVICE FOR TYPEWRITERS AND ADDING MACHINES.

Original No. 1,336,454, dated April 13, 1920, Serial No. 308,362, filed July 3, 1919. Application for reissue filed June 4, 1921. Serial No. 475,123.

*To all whom it may concern:*

Be it known that I, JOHN A. WHERRY, a citizen of the United States, residing at New Orleans, in the parish of Orleans, in the State of Louisiana, have invented certain new and useful Improvements in Collating Devices for Typewriters and Adding Machines; and I do hereby declare the following to be a full, clear, and exact description of the invention, such as will enable others skilled in the art to which it appertains to make and use the same.

This invention relates to a collating device for typewriters and adding machines, and particularly to typewriting machines without the adding features, wherein a revoluble platen is used for ledger-posting and statement-work. The invention is in the nature of an improvement on the invention disclosed and claimed in my Patent, No. 1,324,632, dated December 9, 1919.

The primary object of the invention resides in the provision of a collating device on which the work-sheets may be assembled or collated and carried to the printing position on the typewriter or on the adding machine without disarrangement. Furthermore, it is an object of the invention to dispose the sheet clamping and alining members and the operating mechanism therefor in such manner that they will interfere as little as possible with the assembling or collating operations.

An object of the invention is the provision of means whereby the clamp-operating mechanism, or certain parts of the same, may be located at the rear of the collating board, where it will not interfere with the sheet-assembling or collating operations, or be accidentally disarranged or disturbed in such operations; and, in this connection, a feature of the invention is the provision of clamps, at the front of the board, which have offsets extending through openings in the board to the mechanism at the rear of the board for operating the clamps. A feature of the invention, in this general character of construction, is the provision of means whereby the clamping members may be independently or selectively thrown to effective position, and released together; and the provision of finger-pieces, or other control, at the front of the board, for the operating mechanism at the rear of the board.

Other features and advantages will hereinafter appear.

In the accompanying drawings.

Figure 1:
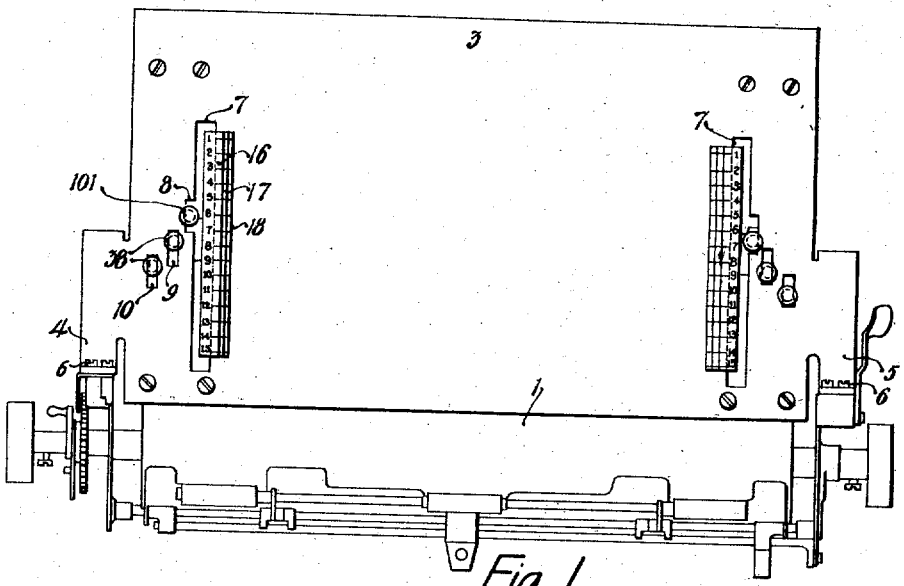
Figure 1 is a front elevation, showing the sheet alining and clamping members at the left side of the figure in their lowered positions, and the sheet alining and clamping members at the right side of the figure in their raised positions.
Figure 2:
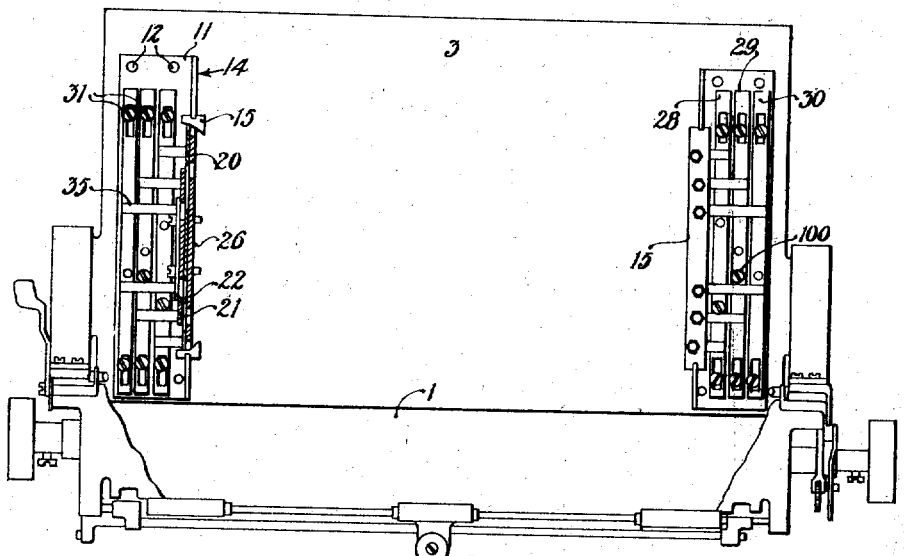
Figure 2 is a rear elevation of the device with the parts in the positions illustrated in Figure 1.

A portion of the typewriter which includes a platen 1 and a carriage 2, is illustrated in the drawings, and my invention is shown as mounted on the carriage ends. The device comprises a collating board 3, which is supported on the carriage ends by standards 4 and 5, these standards being struck from the material of the board at the side edges thereof and being secured at 6 to the carriage ends. The board itself is provided with a pair of parallel elongated openings or slots 7, which are arranged adjacent to the side edges of the board. A series of three slots 8, 9 and 10, is arranged adjacent to each of the slots 7, the slot 8 in each case communicating with the adjacent slot 7, and the slots 9 and 10 being isolated therefrom and from each other.

Figure 10:
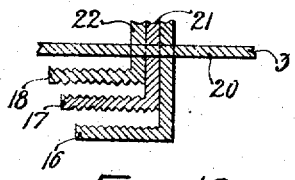
Figure 10 is a detail sectional view, illustrating the formation of the sheet alining and clamping members.
Figure 3:
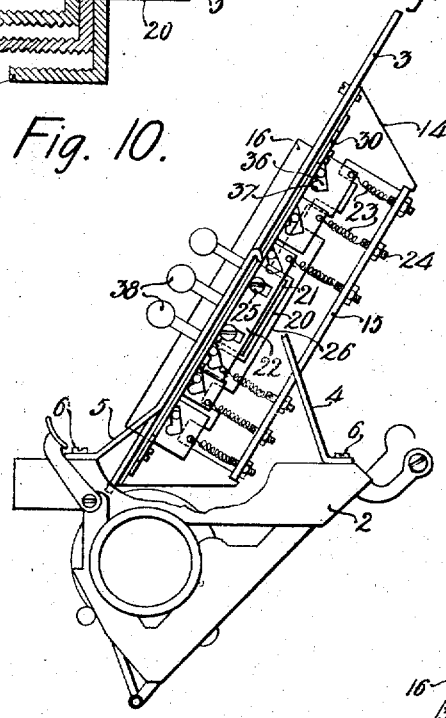
Figure 3 is an end elevation with part of the carriage cut away and with the sheet alining and clamping members lowered to the board.
Figure 11:
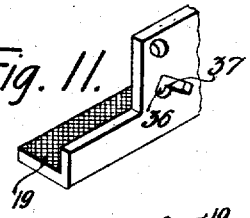
Figures 11 and 12 are detail perspective views, illustrating the milling of the upper and lower surfaces of the sheet alining and clamping members.
Figure 12:
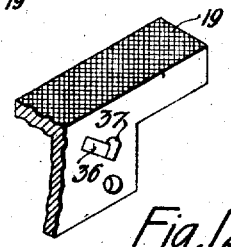
Figure 4:
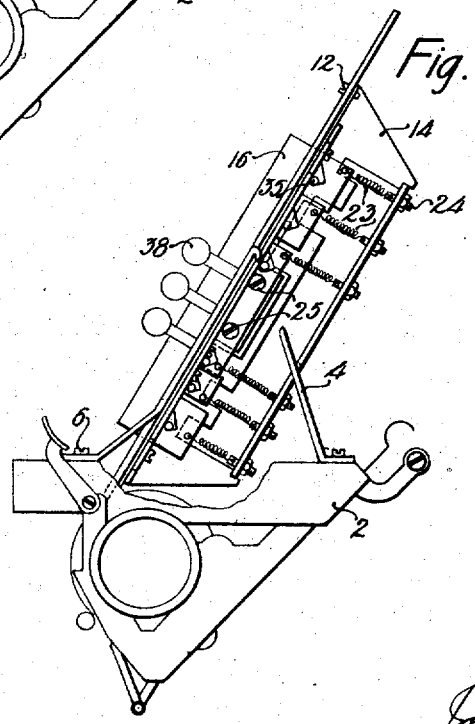
Figure 4 is an end elevation, showing the sheet alining and clamping members raised from the board.
Figure 6:
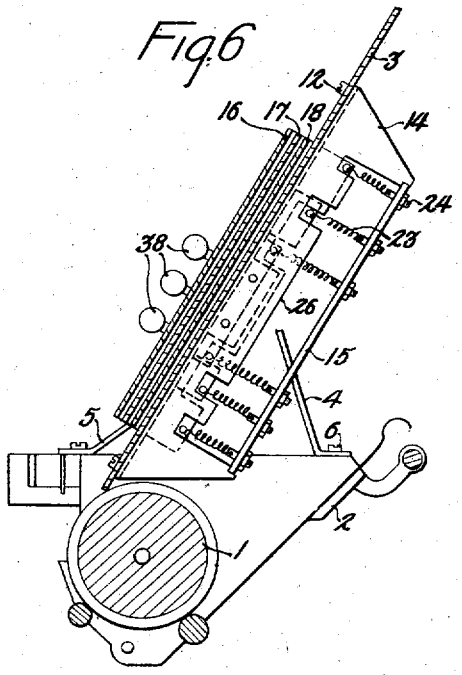
Figure 6 is a sectional view, showing the sheet alining and clamping members raised from the board.
Figure 8:
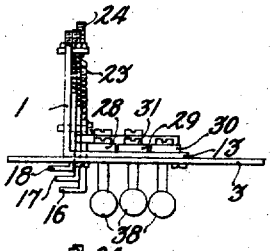
Figure 8 is an end elevation of the portion of the device illustrated in Figure 7, showing the sheet alining and clamping members raised from the board.
Figure 9:
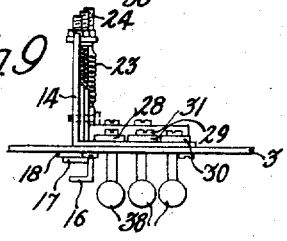
Figure 9 is a similar view, showing the uppermost of the sheet alining and clamping members raised and the remaining members lowered.
Figure 7:
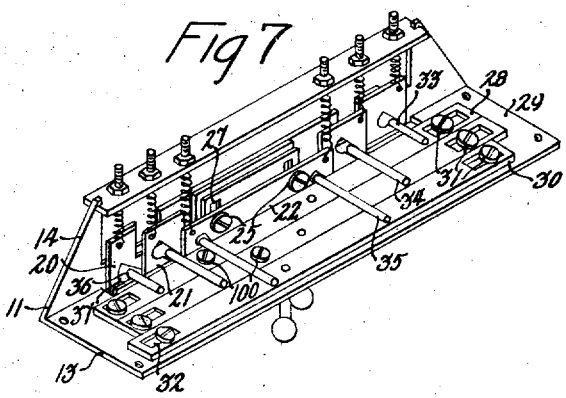
Figure 7 is a perspective view of one of the angular supporting members, showing the sheet alining and clamping members and the supporting members therefor.

On the rear face of the board 3 adjacent to each of the slots, an angular supporting member 11 is secured by suitable fasteners 12, one web 13 of each of the supporting members sliding over against the rear face of the board and the other web 14 extending at right angles thereto. This web 14 is recessed, as shown in Figure 6 of the drawings, and is provided with a bar 15, which is secured to the web at the ends thereof for a purpose which will later appear. Sheet alining and clamping members 16, 17 and 18 (Figures 10 and 11) are mounted on the board and have sheet-engaging portions lying parallel with the front face of the board and in superposed relation to each other. The engaging faces of these sheet-engaging portions are milled as at 19, so as to securely clamp the sheets in place. These sheet alining and clamping members are of angular form and have webs 20, 21 and 22, which extend through the slots 7 in the board. A series of springs 23 are attached to the webs 20, 21 and 22 of the sheet alining and clamping members and to adjustable bolts 24, which pass through the support 15. The tendency of these springs is to normally draw the sheet-engaging portions toward the board into their clamping positions, and the tension of the springs may be, of course, adjusted at will by the adjustment of the bolts 24. The movement of the sheet alining and clamping members with relation to the collating board 3, is at right angles thereto, and this movement is controlled by a pair of guide-screws 25, which are secured to the portion 26 of the web 14 of each angular supporting member. These screws 25 extend through slots 27 in the webs 20, 21 and 22 and thus act as guides.

Mounted on each of the webs 13 of the angular supporting members 11, is a series of slides 28, 29 and 30, the slides being adapted to move longitudinally of the web, and being guided in their movement by screws 31, which extend through slots 32 in the slides and are secured to the web 13. Cam-rods 33, 34 and 35 are secured to and extend transversely of the slides 28, 29 and 30. These cam-rods extend beyond the innermost slide 28 and into diagonally-arranged cam-slots 36, in the webs 20, 21 and 22 of the adjacent sheet alining and clamping members, which cam-slots are provided with depressions or recesses 37, for the reception of the cam-rods 33, 34 and 35.

Operating handles 38 extend through the slots 8, 9 and 10 in the collating board 3, and through slots in the web 13, and are secured to the slides 28, 29 and 30, so that the latter may be moved longitudinally of the web.

Figure 5:
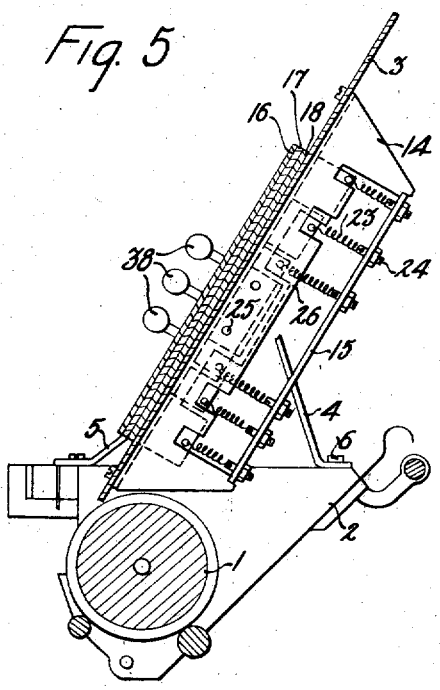
Figure 5 is a sectional view, showing the sheet alining and clamping members lowered to the board.

In operation, assuming that the parts are in the positions illustrated in Figure 5, for instance, that is to say, the sheet alining and clamping members are lowered to the board, the said members may be individually raised from the board by pulling downward on the proper operating handle 38. The downward movement of each of these handles causes the movement of one of the slides 28, 29 or 30, and, as a result, causes the cam-rods, which are secured to the particular slide to move in the slots 36. Inasmuch as the cam-rods are fixed with relation to the web 13, so far as any movement at right angles thereto is concerned, the sheet alining and clamping members will be moved away from the board by the relative movement between the cam-rods and the cam-slots. Of course, this movement of the sheet alining and clamping members will take place in opposition to the springs 23, and, when each of the said sheet alining and clamping members reaches the extent of its movement, it will be locked in said position by the passage of the cam-rods into the recesses 37 in the cam-slots and will be held in such a position against the action of the springs 23 until properly released. Of course, the sheet alining and clamping members may then be moved toward the board by the opposite movement of the handles 38, that is to say, they may be moved into their clamping or operative positions, assisted by the springs, and held by the springs in operative positions.

It will be appreciated from the above description that the sheet alining and clamping members may be raised individually, so that the collating operation will be greatly facilitated and consequently the chance of displacement of the sheets will be reduced to a minimum. Furthermore, the location of the operating means on the rear of the collating board facilitates the collating, since it renders the face of the board particularly free.

As above stated, the sheet alining and clamping members may be moved individually to and away from the collating board, but it is to be realized that, by raising the lowermost of said members, the other two will be raised, and, by raising the intermediate of said members, the uppermost member will be raised. For this latter purpose, it will be noted that the slides 28 and 29 are provided with screws 100, acting as detents, so that, upon the downward pressure on the handle, which is indicated at 101 in Figure 1, the simultaneous raising of the sheet clamping and alining members is caused by the screw 100 on the slide 28 engaging one of the rods 34 on the slide 29, thereby moving the latter slide so that the screw 100 on that slide engages one of the rods 35 on the slide 30 and moves the same; all of the clamps being thus lifted when the handle 101 of the lowermost clamp is pulled down.

Variations may be resorted to within the scope of the invention, and portions of the improvements may be used without others.

Having thus described my invention, I claim:

1. In a collating device, the combination with a board, of sheet alining and clamping members mounted thereon in superposed relation, said members comprising sheet-engaging portions and webs which extend through the board, means connected to the webs for normally drawing said sheet-engaging portions toward the board, means for raising said portions away from the board, and means for maintaining said portions in their raised positions.

2. In a collating device, the combination with a board, of angular sheet alining and clamping members having sheet-engaging portions disposed in superposed relation on the front of the board and having webs extending through the board, and resilient means attached to said webs for normally drawing the sheet-clamping portions toward the board.

3. In a collating device, the combination with a board, of angular sheet alining and clamping members having sheet-engaging portions disposed in superposed relation on the front of the board and having webs extending through the board, resilient means attached to said webs for normally drawing the sheet-clamping portions toward the board, and means for raising the sheet-clamping and alining members from the board individually.

4. In a collating device, the combination with a board, of angular sheet alining and clamping members having sheet-engaging portions disposed in superposed relation on the front of the board and having webs extending through the board, resilient means attached to said webs for normally drawing the sheet-clamping portions toward the board, means for raising the sheet clamping and alining members from the board individually, and means for maintaining said members in their raised positions.

5. In a collating device, the combination with a board, of angular sheet alining and clamping means mounted on the rear of the board extending through the same and having sheet-engaging portions located at the front of the board for alining, collating and clamping work-sheets while the ends of said sheets are located between the feed-rollers and the platen of the type-writer, and means on the rear of the board for normally drawing said portions toward the board.

6. In a collating device, the combination with a board, of angular sheet alining and clamping means mounted on the rear of the board extending through the same and having sheet-engaging portions located at the front of the board for alining, collating and clamping work-sheets while the ends of said sheets are located between the feed-rollers and the platen of the type-writer, means on the rear of the board for normally drawing said portions toward the board, and means for raising the members individually.

7. In a collating device, the combination with a board, of angular sheet alining and clamping means mounted on the rear of the board extending through the same and having sheet-engaging portions located at the front of the board for alining, collating and clamping work-sheets while the ends of said sheets are located between the feed-rollers and the platen of the typewriter, means on the rear of the board for normally drawing said portions toward the board, means for raising the members individually, and means for maintaining said members in their raised positions.

8. A collating device, comprising a board, of angular sheet alining and clamping members mounted on the rear of the board, extending through the same and having sheet-engaging portions arranged in superposed relation on the front face of the board, resilient means for normally drawing the said portions toward the board, and means for varying the tension of said resilient means.

9. A collating device comprising a board, angular supporting members mounted on the rear of said board, angular alining and clamping members mounted on said supporting members and having cam-slots therein, movable cams carried by the supporting members and extending through said slots, means for actuating the cams to move the sheet alining and clamping members away from the board, and resilient means for returning said members to their original positions.

10. A collating device comprising a board, angular supporting members mounted on the rear thereof, angular sheet alining and clamping members slidably mounted on said supporting members and extending through the board, means for causing the last-mentioned members to slide on the first-mentioned members in one direction to raise the same from the board, and means for locking the clamping members in their raised positions.

11. A collating device comprising a board, angular supporting members mounted on the rear thereof, angular sheet alining and clamping members slidably mounted on said supporting members and extending through the board, means for causing the last-mentioned members to slide on the first-mentioned members in one direction to raise the same from the board, means for locking the clamping members in their raised positions, and means for returning the clamping members to their initial positions.

12. A collating device comprising a board, angular sheet alining and clamping members having sheet-engaging portions disposed in superposed relation on the front of the board and having webs extending through the board to the back thereof, means for selectively raising said sheet-engaging portions, and means for simultaneously raising said portions.

13. In a collating device, the combination with a board, of sheet-clamping members having sheet-engaging portions disposed in superposed relation on the front of the board and having offsets extending through the board, and means attached to said offsets for moving the sheet-engaging portions toward the board.

14. In a collating device, the combination with a board, of sheet-clamping members having sheet-engaging portions disposed in superposed relation on the front of the board and having offsets extending through the board, and means attached to said offsets for moving the sheet-engaging portions toward the board, and for raising the sheet-clamping members from the board individually.

15. In a collating device, the combination with a board, of a sheet-clamping device having a sheet-gripping element on the front side of the board, an offset from said gripping element extending through the board, to the rear thereof, means connected to said offset on the rear side of the board for moving said gripping element by a right line movement away from the board, and resilient means constantly urging said gripping element toward the board.

16. In a collating device, the combination with a board, of a plurality of sheet-clamping devices having sheet-gripping elements on the front side of the board, offsets from said gripping elements extending through the board, to the rear thereof, and means connected to said offsets on the rear side of the board for moving said gripping elements rectilinearly independently of each other, toward the board.

17. In a collating device, the combination with a board, of a sheet-clamping device having a sheet-gripping element on the front side of the board, an offset from said gripping element extending through the board, means connected to said offset on the rear side of the board for moving said gripping element with respect to the face of the board, and a finger-piece extending through the board from the front side thereof for operating said connection to the offset.

18. In a collating device, the combination with a board, of a plurality of sheet-clamping devices having sheet-gripping elements on the front side of the board, offsets from said gripping elements extending through the board, to the rear thereof, slides at the rear of the board connected respectively to said offsets to move the gripping elements with respect to the face of the board, and means for individually actuating said slides.

19. In a collating device, the combination with a board, of a plurality of sheet-clamping devices having sheet-gripping elements on the front side of the board, offsets from said gripping elements extending through the board, slides at the rear of the board, one connected to each of said offsets, to move the gripping elements with respect to the face of the board, and means for actuating said slides, said slides having means whereby actuation of one of the slides in one direction effects movement of another of said slides.

20. In a collating device, the combination with a board, of a plurality of sheet-clamping devices having sheet-gripping elements on the front side of the board, offsets from said gripping elements extending through the board, slides at the rear of the board, one connected to each of said offsets, to move the gripping elements with respect to the face of the board, and means for actuating said slides, said slides having means whereby actuation of one of the slides in one direction effects movement of another of said slides, while permitting movement of said slides independently of each other in the other direction.

21. In a collating device, the combination with a board, of a device for clamping a sheet to one face of the board including a clamping portion and a side gage for the sheet thus to be clamped, connected to the clamping portion of the device and projecting therefrom into the board, and means for moving the clamping device, to and from the board between ineffective and effective positions; the projection of the gage into the board being such that it continues to intersect the board when moved with the clamping device to the ineffective position of the latter.

22. In a collating device, the combination with a board, of a device movable to and from one face of the board for clamping a sheet thereto, including a clamping portion and a side gage, for the sheet thus to be clamped, connected to the clamping portion of the device and projecting therefrom through the board, and means connected to the gage on the other side of the board for moving the gage to release and apply the clamping device while maintaining the intersection of the gage with the sheet surface of the board in a uniform position.

23. A collating device including a board and superimposed sheet-clamping and aligning members arranged on the sheet-guiding side of the board, each of said members being provided with a side-edge gage to cooperate with a work-sheet to be clamped by the side of the clamping member facing the board.

24. A collating device including a board and an aligning and sheet-clamping member on the sheet-guiding face of the board, said member being movable away from said board to permit a work-sheet to be inserted therebetween and aligned by said member preparatory to clamping said work-sheet.

25. A collating device including a board and superimposed sheet-clamping and aligning members on the sheet-guiding side of the board and movable therefrom to permit a work-sheet to be inserted between the board and the inner sheet-clamping member and aligned by the latter, and to permit another work-sheet to be inserted between two adjacent sheet-clamping members and aligned by one of them preparatory to clamping said work-sheets.

26. A collating device comprising a board, sheet-aligning and clamping members to cooperate with superposed work-sheets on the board, each member serving to align and clamp a sheet at that side of the clamp which faces the board, means for pressing said members toward the work-sheet-supporting side of the board, and means for withdrawing said members from the board individually.

JOHN A. WHERRY.

Witnesses:
St. Clair Adams,
J. N. Swing.